United States Patent [19]

Shafer, Jr.

[11] 4,410,480

[45] Oct. 18, 1983

[54] METHOD OF EMBEDDING ONE ARTICLE WITH ANOTHER

[76] Inventor: Gale E. Shafer, Jr., Rt. 3, Ottawa, Ohio 45875

[21] Appl. No.: 378,983

[22] Filed: May 17, 1982

Related U.S. Application Data

[62] Division of Ser. No. 233,032, Feb. 9, 1981, Pat. No. 4,344,600.

[51] Int. Cl.³ .................. B29C 5/00; B29C 27/00
[52] U.S. Cl. .................... 264/262; 264/263; 264/267
[58] Field of Search ............ 264/261, 262, 263, 275, 264/279, 267

[56] References Cited

U.S. PATENT DOCUMENTS

| | | | |
|---|---|---|---|
| 2,377,393 | 6/1945 | Wiley | 264/254 |
| 2,677,855 | 5/1954 | Mallory | 264/277 |
| 2,951,260 | 9/1960 | Harrison et al. | 425/258 |
| 2,987,570 | 6/1961 | Bluth | 264/275 |
| 3,020,594 | 2/1962 | Makowski | 264/318 |
| 3,372,220 | 3/1968 | Stingley | 264/261 |
| 3,482,814 | 12/1969 | Hedgewick | 249/67 |
| 3,890,420 | 6/1975 | Neward | 264/261 |
| 3,945,535 | 3/1976 | Leiste et al. | 425/243 |
| 3,993,420 | 11/1976 | Haas et al. | 425/127 |
| 4,010,903 | 3/1977 | Sakuri et al. | 239/533.1 |
| 4,218,417 | 8/1980 | Jacquemart | 264/275 |

FOREIGN PATENT DOCUMENTS 1496387 10/1966 France .

*Primary Examiner*—Willard E. Hoag
*Attorney, Agent, or Firm*—Wilson, Fraser, Barker & Clemens

[57] ABSTRACT

A method of and mold for embedding a tubular member within a casing wherein the mold compensates for variations in length of the tubular member. The mold is a two-member structure wherein one of the members is provided with a cavity for receiving the tubular member and the casing. The cavity is closed at one end by a movable ring insert which moves relative to the assembled relationship of the tubular member within the casing to compensate for any length variations.

3 Claims, 4 Drawing Figures

METHOD OF EMBEDDING ONE ARTICLE WITH ANOTHER

This is a division, of application Ser. No. 233,032 filed Feb. 9, 1981 now U.S. Pat. No. 4,344,600.

BACKGROUND OF THE INVENTION

1. Field of the Invention

This invention relates generally to the art of injection molding and, more particularly, to a two-part mold apparatus wherein an article is embedded by a matrix of plastic material within a casing wherein the plastic material also forms a desired interior configuration of the assembled unit.

2. Description of the Prior Art

In many cases wherein a tubular member is embedded by a matrix of plastic material within a cylindrical casing in a mold, it is important that the mold provides an exact axial relationship for the tubular member and the casing.

One prior method of producing such an article is to place a tubular member assembled within a casing, on a post located in the center of a mold cavity and employing the walls and floor defining the cavity, for determining the assembled relationship of the tubular member in the casing. In this method, the axial position of the post relative to the cavity of the mold is usually adjusted until the desired axial relationship between the tubular member and the cylindrical casing is obtained. Although this method is satisfactory for components of fixed size, it is not satisfactory for establishing an exact relationship between a tubular member and a casing when the lengths of the tubular member and the casing are variable, such as when the length of the casing varies within the manufacturing tolerances and the tubular member is formed from a stack of laminated discs wherein the number of discs may vary. That is, there may be times when the tubular member may be formed from a stack having too many or too few discs. Accordingly, it is desirable to provide a mold for embedding a tubular member in a cylindrical casing wherein the mold is provided with means which automatically compensate for the variances in the length of the tubular member and the casing.

SUMMARY OF THE INVENTION

Briefly, the aforementioned problem is solved by providing an injection mold having a potting post with a novel spring biased ring insert surrounding the potting post. The ring insert is adapted to support the assembled tubular member and the casing and allows a limited amount of axial movement compensating for variances in the lengths of the tubular member and the casing when the mold is shut.

More particularly, the injection mold generally comprises a lower stationary mold half and an upper vertically movable mold half. The lower mold half is provided with a cylindrical cavity into which the upper portion of the potting post projects in a central location. The novel spring biased ring insert is positioned to surround the projection portion of the potting post and define the bottom floor of the cavity. In this arrangement, the ring insert is provided with a first portion for supporting the bottom end of a tubular member assembled within the casing and a second portion for clearing the variable length of the open end of a cylindrical casing. The upper mold half includes an injection nozzle for injecting a matrix into the lower mold half in a manner for forming a desired configuration within the tubular member which is assembled within the cylindrical casing.

An object of this invention is to produce a method for varying the shut height of a mold cavity.

Another object of this invention is to produce an injection mold having means which automatically compensate for any variance required in the shut height of the cavity provided in the mold.

Other objects and advantages of the invention will become more apparent during the course of the following description, when read in conjunction with the accompanying drawings.

BRIEF DESCRIPTION OF THE DRAWINGS

In the drawings wherein like numerals are employed to designate like parts throughout the same.

DESCRIPTION OF THE PREFERRED EMBODIMENTS

Figure 1:
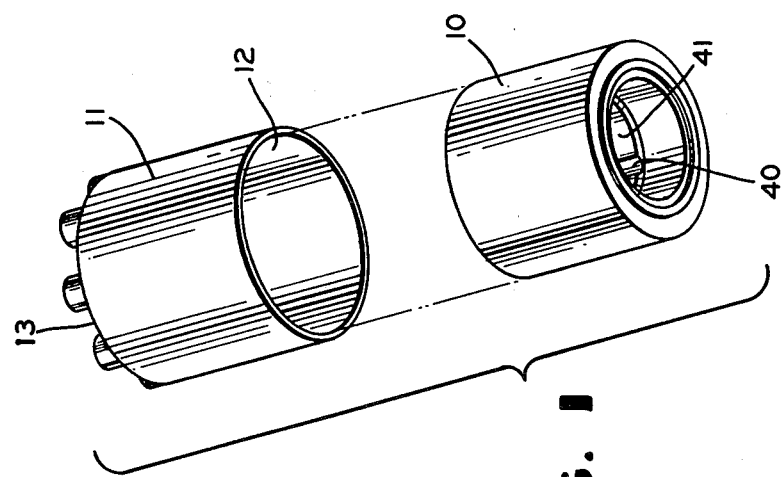
FIG. 1 is an exploded perspective view of two members which are bonded together, in which a matrix of plastic material forms a desired interior configuration in the tubular member.

Referring now to the drawings, particularly to FIG. 1, there is illustrated a tubular member 10 which is insertable in a cylindrical casing 11 having an open end 12 and a closed end 13. The tubular member 10 is bonded within the casing 11 and a matrix 14 of plastic material is injected into the casing 11 through an aperture 15 provided in the closed end of the casing (see FIG. 3) for forming a desired interior configuration in the assembly.

Figure 2:
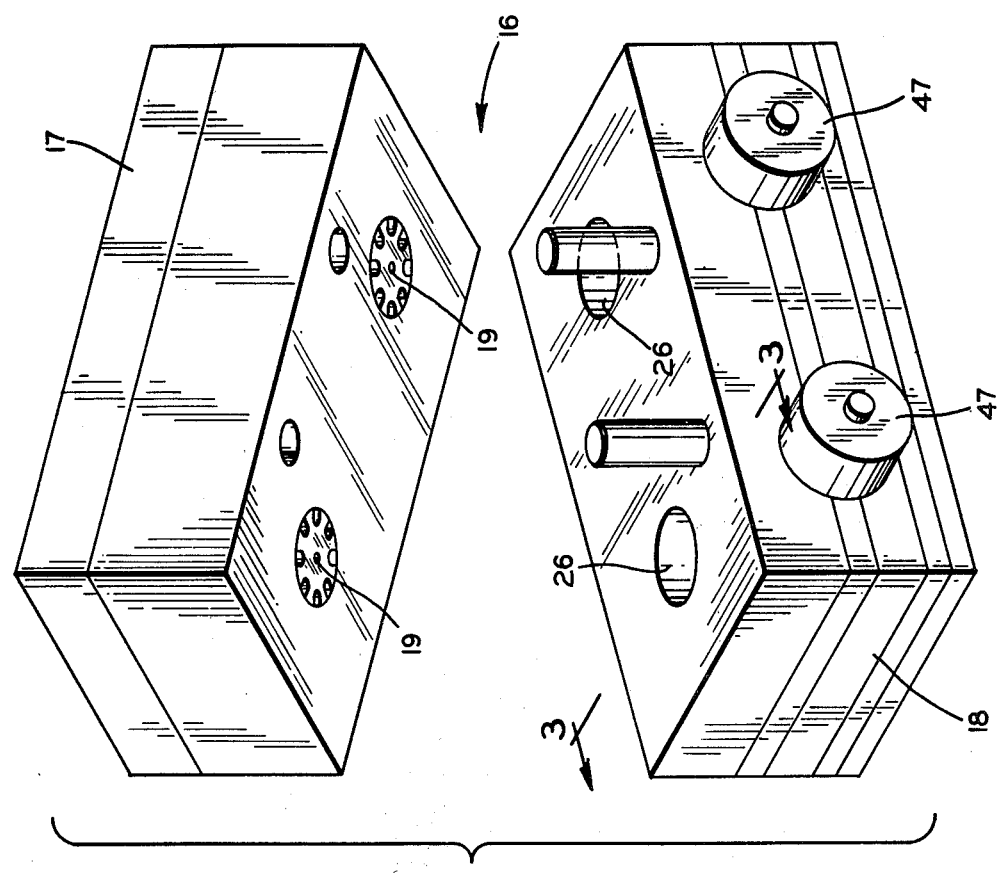
FIG. 2 is an exploded perspective view of a two part injection mold.

Briefly, as illustrated in FIG. 2, a two-section mold 16, for performing the afore-described operation, generally comprises an upper vertically movable mold half 17 and a lower stationary mold half 18. The upper mold half 17 is suitable secured to a conventional press having a movable platen (not shown) which is vertically moved by suitable conventional power means (not shown). The upper mold half 17 may include an injection device (not shown) which applies a plasticized flowable plastic material, forming the matrix 14, to the lower mold half 18 through a nozzle 19 (see FIG. 2). It should be noted that as illustrated in FIG. 2, the mold 16 is adapted to process two assemblies at the same time. However, since the apparatus for processing each assembly is exactly the same, only one will be shown and described.

Figure 3:
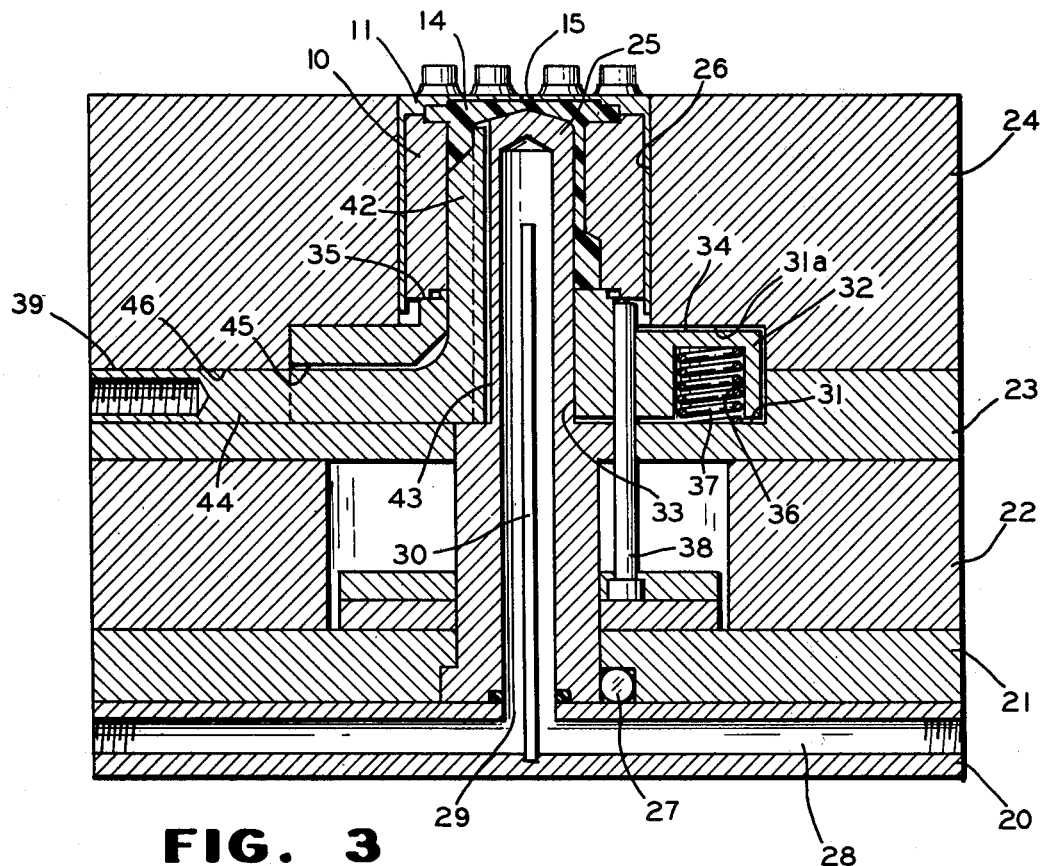
FIG. 3 is a cross-sectional view taken substantially along line 3—3 in FIG. 2 of the mold half embodying the invention.

Referring now to FIG. 3, the lower mold half 18 is a laminated structure generally comprising a bottom cooling plate 20, a post retainer plate 21, a spacer rail plate 22, a support plate 23 and a cavity plate 24, all of rectangular form and suitably secured together by means (not shown) in a conventional manner. Further, the lower mold half 18 includes an upstanding potting post 25 extending from the cooling plate 20 through the retainer plate 21, the spacer rail plate 22 and the support plate 23 into the center of a cavity 26 provided in the cavity plate 24. The potting post 25 is secured in a fixed upright position in the retainer plate 21 by a locking dowel 27 in a conventional manner. The potting post 25 may be cooled by circulating a cooling fluid, such as water, through a duct 28 provided in the cooling plate 20 and opening into a bore 29 provided in the potting post 25. A baffle 30 provided in the bore 29 directs the cooling fluid to the top of the potting post 25.

Figure 4:
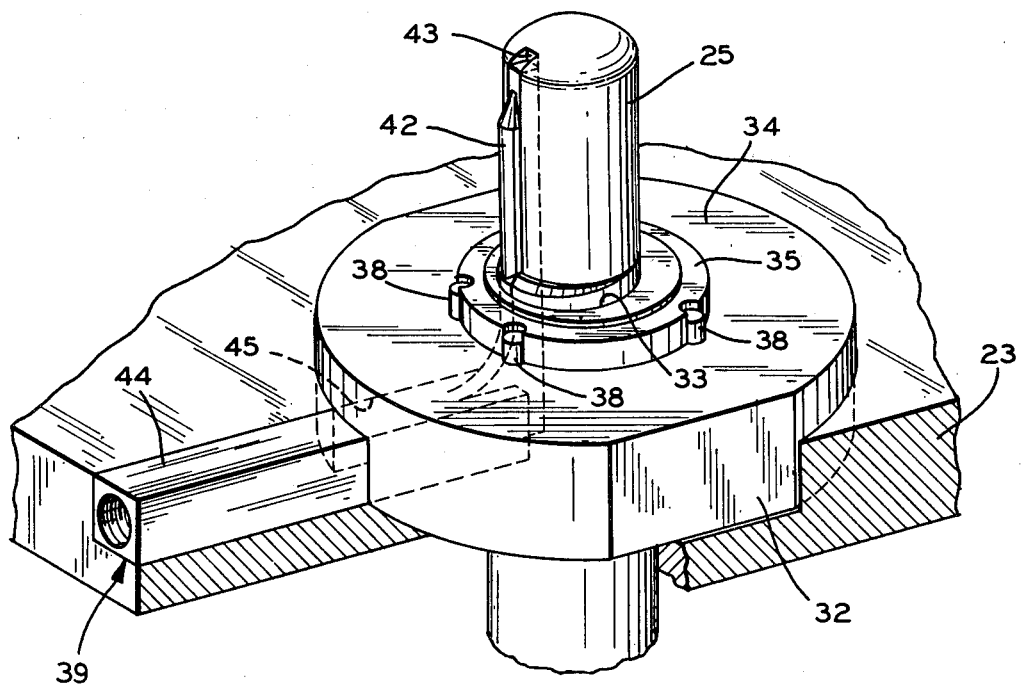
FIG. 4 is a fragmentary perspective view with parts broken away of the ring insert and potting post employed in the invention.

Referring now to FIGS. 3 and 4, the adjacent surfaces of the support plate 23 and the cavity plate 24 are provided with complementary bores 31 and 31a for receiving a ring insert 32 having a central bore 33 surrounding the potting post 25. The upper surface 34 of the ring insert 32 is provided with a stepped raised portion 35 for supporting an end of a tubular member 10 placed on the potting post 25. It should be noted that the surface 34 also provides clearance for the open end 12 of the cylindrical casing 11. The bottom surface of the ring insert 32 is provided with a plurality of blind bores 36 (only one shown) each seating a compression spring 37. The compression springs 37 bear on the blind end of the bore 36 to move the ring insert 32 upwardly against the top surface of the bore 31a.

A plurality of circumferentially spaced, conventional knock-out pins 38 extending through the ring insert 32 are provided around the potting post 25 for removing a molded assembly from the cavity 26.

A transversely movable pressure pad 39 may be provided in the cavity 26 for forming a vertically extending channel 40 in the bore 41 formed by matrix 14 (see FIG. 1). As illustrated in FIGS. 3 and 4, the pressure pad 39 is an L-shaped member having an upright arm 42 located in the vertically extending slot 43 provided in the potting post 25 and a horizontally extending arm 44 extending through cooperating bores 45 and 46 formed in the ring insert 32 and the support and cavity plates, respectively. The pressure pad 39 may be moved by a pancake type, power cylinder 47. Since the pressure pad 39 does not form any of the present invention, further discussion is not deemed necessary.

In operation, the tubular member 10, assembled in the casing 11, may be placed in the cavity 26 of the stationary mold half 18 on the projecting end of the potting post 25 until it contacts the raised portion 35 of the ring inset 32. The open end 12 of the cylindrical casing 11 will clear the surface 34 of the ring insert, thus allowing for a variance in length of the casing. Next, the vertically movable mold half 17 is moved into engagement with the stationary mold half 18 thus closing the mold 16. It should be noted that if the tubular member 10 holds the casing above the top surface of the mold half 18, the movable mold half 17 will push against the casing 11 which in turn pushes against the ring insert 32. The springs 37 permit the ring insert 32 to move downwardly thus increasing the shut height of the cavity 26. On the other hand, if the tubular member 10 permits the closed end 13 of the cylindrical casing 11 to drop below the top surface of the mold half 18, the springs 37 will move the ring insert 32 and the cylindrical casing 11 upwardly thus moving the closed end 13 of the casing into engagement with the adjacent surface of the movable mold half 17. In this instance the shut height of the cavity 26 will be decreased.

It is to be understood that the form of the invention herewith shown and described is to be taken as a preferred embodiment of the same and that various changes in the shape, size and arrangement of the parts may be resorted to without departing from the spirit of the invention.

I claim:

1. A method of positioning two members within an injection mold cavity having an opening formed in one surface thereof comprising the steps of:
 (a) inserting the two members within the mold cavity;
 (b) positioning the two members axially relative to each other within the mold cavity;
 (c) axially supporting the one member to be bonded relative to the other member within the mold cavity; and
 (d) resiliently urging the supported member toward the cavity opening whereby the shut height of the mold cavity is automatically adjusted to enable the two members to assume a desired axial relationship relative to each other.

2. The method according to claim 1 including the step of radially positioning the two members relative to the mold cavity.

3. The method according to claim 1 including the step of injecting a matrix of bonding material into the mold cavity after the two members have assumed the desired axial relationship.

* * * * *